UNITED STATES PATENT OFFICE.

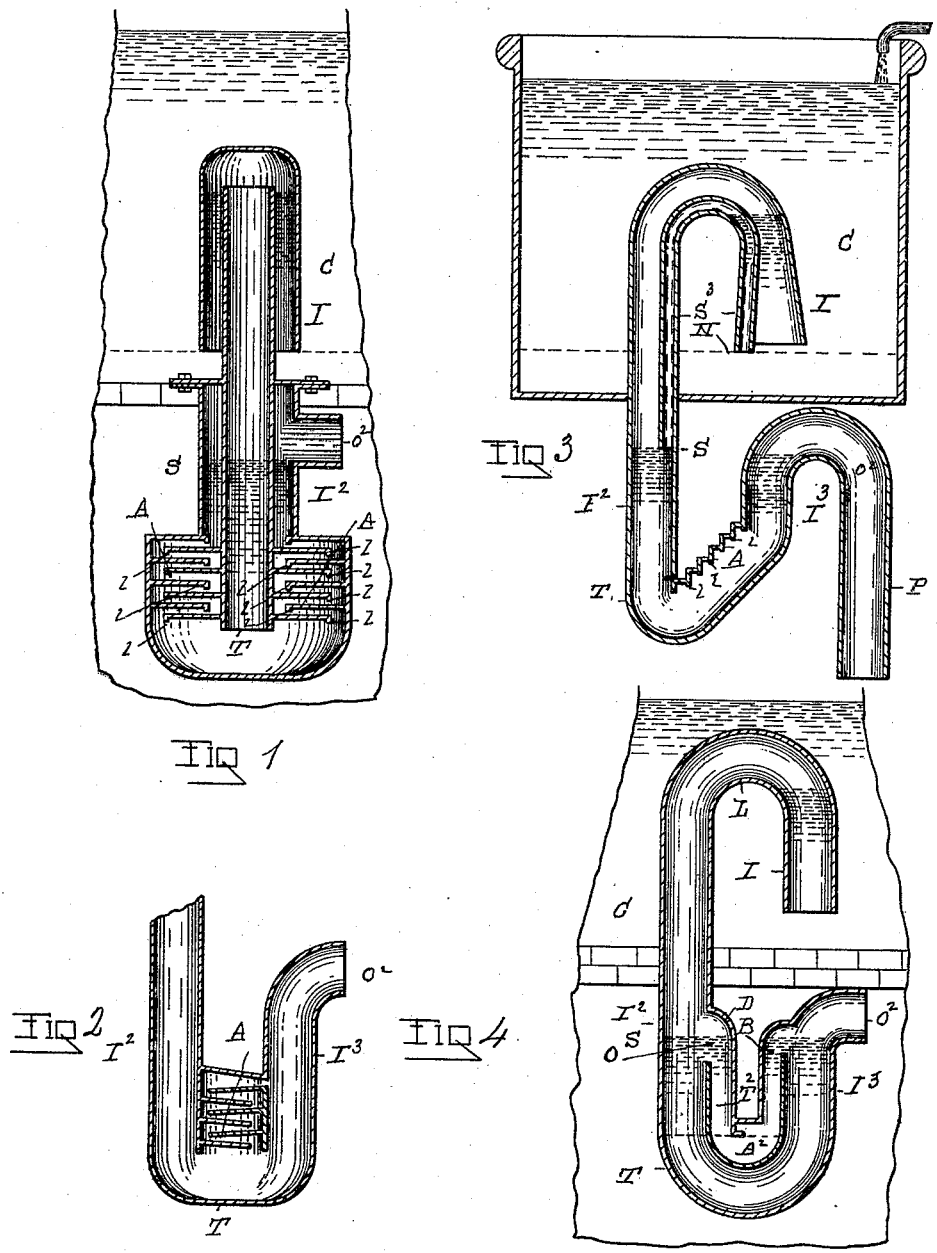

LEW M. HAWLEY, OF SCHENECTADY, NEW YORK.

SIPHON AND TRAP FOR FLUSHING APPARATUS.

SPECIFICATION forming part of Letters Patent No. 415,911, dated November 26, 1889.

Application filed March 16, 1889. Serial No. 303,600. (No model.)

*To all whom it may concern:*

Be it known that I, LEW M. HAWLEY, of the city of Schenectady, county of Schenectady, and State of New York, have invented a new and useful Improvement in Siphons and Traps for Flushing Apparatus, of which the following is a specification.

My invention relates to improvements upon siphons, trapped siphons, and traps that are employed for flushing cisterns, cesspools, and other similarly-operating apparatus; and the object and purpose of my invention is to make this class of devices better adapted for the uses for which they are designed.

My invention consists (as will be more fully detailed hereinafter in connection with its illustration) in the combination, with a trap or combined trap and siphon, of one or more air-retaining pockets arranged within the trap between the balancing columns of water of its intake and uptake legs, and in such a position near the bottom thereof that as the column-pressure upon the intake-leg of the trap increases the bubble of air retained will by its release and ascension with momentum destroy the equilibrium between the columns and start the action of the trap or combined trap and siphon.

My invention also consists (as will be fully detailed hereinafter in connection with its illustration) in the combination, with a siphon having a trap, of an accessory siphon arranged within the siphon proper for refilling the trap at the end of each discharge, and also the combination, with the siphon and accessory siphon so constructed, of an air-bubble-retaining pocket or pockets arranged between the two columns of the trap.

Accompanying this specification, to form a part of it, there is a plate of drawings containing four figures illustrating my invention, with the same designation of parts by letter-reference used in all of them.

Of these illustrations, Figure 1 is a section of an annular siphon and trap with my invention applied thereto. Fig. 2 is a section of a U-form trap with my invention applied thereto. Fig. 3 shows a section of a bent siphon having a secondary or accessory siphon and a U-form trap having interiorly formed therein a series of air-retaining pockets between the two legs of the trap, the function of the accessory siphon being for refilling the trap at the end of each discharge to seal the same. Fig. 4 shows in section an ordinary siphon and trap, the latter being constructed with an accessory trap containing my invention applied thereto.

The several parts of the apparatus thus illustrated are designated by letter-reference, and the function of the parts is described as follows:

The letter I designates the intake-leg of the siphons, and $I^2$ the intake-legs of the traps T; $I^3$, the uptake-legs thereof; S, the sealing-level of the traps T, and $S^3$ the accessory siphon.

C designates the cistern, and $C^2$ the trap-discharge.

The letters A designate shelves arranged upon the uptake-leg of the trap, which, as shown at Fig. 1, are arranged alternately on the opposite sides of the uptake-leg of the trap and the long leg of the siphon, so as to break joints and produce a zigzag course for the air when forced upwardly around the free ends of each of the said shelves, the latter each having a retaining-lip $l$ on its free edge, so that as the water rises in the intake-leg I' of the siphon and forces the air downwardly through the long leg of the siphon into the trap bubbles of the passing air will be caught under these shelves in the trap until their augmentation is sufficient to displace the one at the bottom, when it will pass out under the lip $l$ and join the bubble on the shelf above to aggregate as they are forced out in succession until they leave the upper shelf in one bubble that takes on momentum in rising from the shelves, and thus facilitates the starting of the siphon by the rapidity of its movement and the impetus it gives to the following water. As shown at Fig. 2, these air-retaining shelves are made in the bottom of the trap, between the intake and outlet legs thereof, with the free end of the shelves projecting downwardly as extended toward each other, and in this instance the air caught beneath the shelves (when the trap is being started to operate) is held in separate bubbles beneath each of the shelves until forced out by the augmentation of the air from the bottom shelf first, to take up in ascending and by aggregation all the bubbles into one, which rises in the outlet-leg with rapidity and momentum, that is communicated to the water following sufficiently to start the overflow of the trap by its impetus.

As shown at Fig. 3, the shelves A are illustrated as formed on the slanting side of the uptake-leg of the trap, and their operation is the same as in the other figures. In Fig. 3 an accessory siphon $S^3$ co-operates with the air-retaining pockets A as follows: When the water rises in the intake-leg of the siphon proper, (shown at Fig. 3,) the accessory siphon $S^3$ acts with the latter and in connection with the air-retaining pockets A to start the flow; but the particular function of this accessory siphon is to refill the trap after the water-level of the cistern has fallen to the level of the intake-leg of the siphon proper. To accomplish this latter result, after the draft influence exerted by the descending column of water in the outlet-pipe P of the trap has drawn the water from out of the latter, the intake-leg of the accessory siphon is arranged to take water from the cistern at a lower level than that of the intake-leg of the siphon proper, as indicated at N, so that the accessory siphon continues to act after the action of the siphon proper has ceased, and which continued action serves to fill the trap.

As shown at Fig. 4, in which an accessory trap $T^2$ is used, the air-retaining pocket $A^2$ is made in the bottom of the walls which divide the intake from the uptake legs of the trap proper, and in this instance there is a single air-retaining pocket that is made larger than the others, and which application constitutes a modification of my invention, in which an L-form extension of the wall of the intake-leg of the trap is continued down into the trap interior below the bottom of the upper boundary of the bend forming the two legs of the trap. In this case the air-retaining pocket performs the same function in starting the overflow from the trap that it does in the cases before described, with this exception, that its immediate effect is had upon the accessory trap. This accessory trap $T^2$ is arranged to connect with the long leg of the siphon by means of an opening O, that is vertically in line with the low point L of the siphon, and to connect at its overflow B at a point below the sealing-level of the trap proper. By the low point is meant that point of the siphon along over which the water first commences to flow, and which, in following along down the long leg of the siphon to the offset D, will enter and first fill the accessory trap. As thus arranged, a trap provided with an air-retaining pocket or pockets that release the air held by them when the augmentation of the air reaches its maximum and just before the water reaches its overflow-level, when the liberation of which air occurs, gives an impetus or momentum to the ascending column, which renders the starting of the trap prompt and automatic.

I do not limit my invention to the particular form of air-starting pockets shown, but do limit it to such a construction of them as will operate substantially in the same manner.

Having thus described my invention, what I claim, and desire to secure by Letters Patent, is—

1. The combination, with a siphon that is provided with a trap, of an accessory siphon arranged to act in connection with the siphon proper, said accessory siphon being arranged to have its intake-leg take water from a lower level than that of the trap proper, and constructed to operate substantially in the manner as and for the purposes set forth.

2. The combination, with a flushing-trap, of an air-retaining pocket or pockets arranged therein between the lower part of the intake-leg and the lower part of the uptake-leg of the trap, constructed and arranged to operate substantially in the manner as and for the purposes set forth.

3. The combination, with a siphon, of a trap constructed with an air-retaining pocket or pockets arranged between the intake-leg of the trap part and the uptake-leg of the latter, constructed and arranged to operate substantially in the manner as and for the purposes set forth.

4. The combination, with a siphon having a trap, of an accessory trap arranged within the trap part and having an L-form air-retaining pocket produced therein by the subtension of the inner side wall of the intake-leg of the trap, constructed and arranged to operate substantially in the manner as and for the purposes set forth.

Signed at Troy, New York, this 23d day of February, 1889, in the presence of the two witnesses whose names are hereto written.

LEW M. HAWLEY.

Witnesses:
CHARLES S. BRINTNALL,
N. E. HAGAN.